March 3, 1931.  J. G. YONKESE  1,794,432
TRANSMISSION CASING
Filed May 15, 1928  4 Sheets-Sheet 1
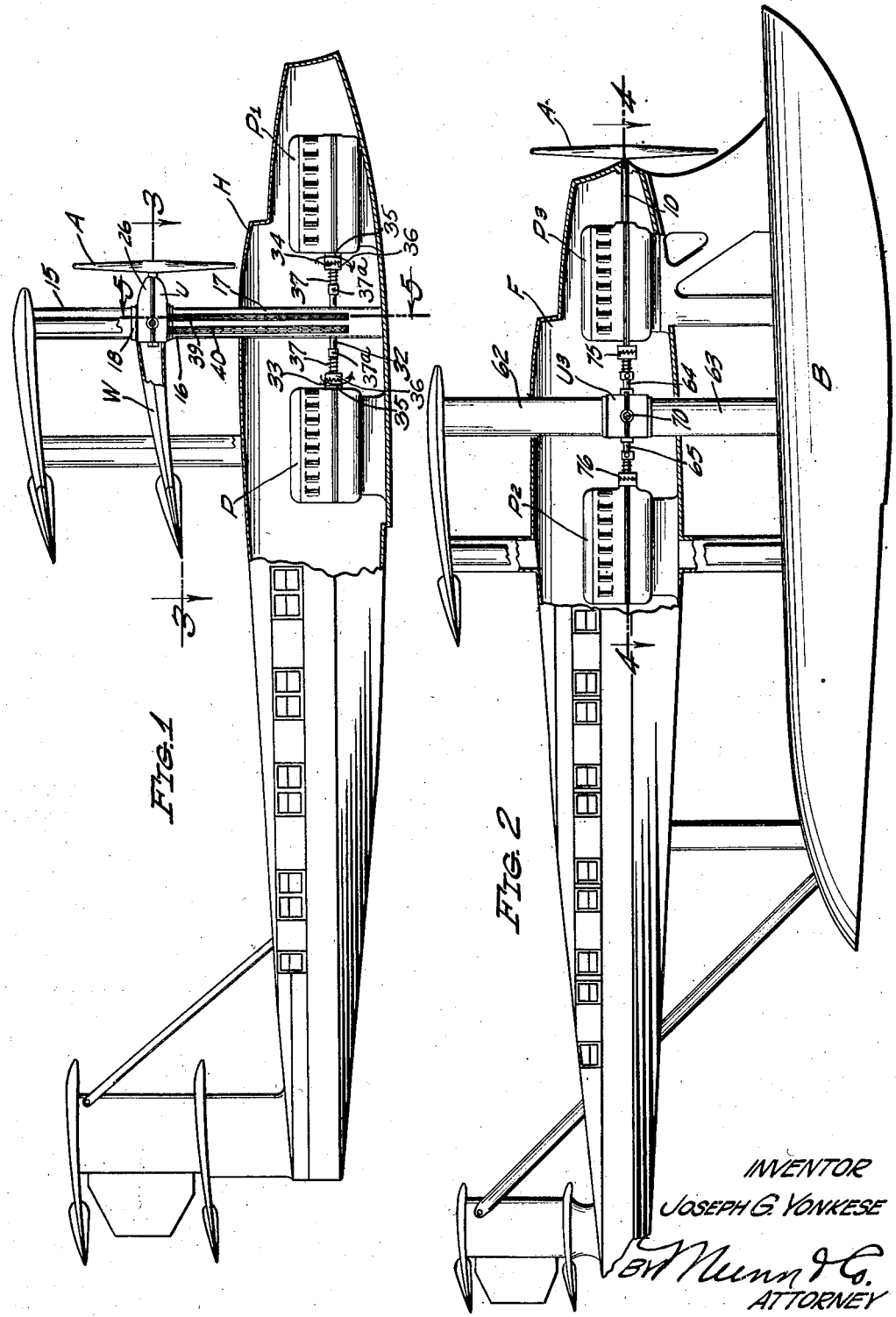
INVENTOR
JOSEPH G. YONKESE
ATTORNEY March 3, 1931. J. G. YONKESE 1,794,432
TRANSMISSION CASING
Filed May 15, 1928 4 Sheets-Sheet 2
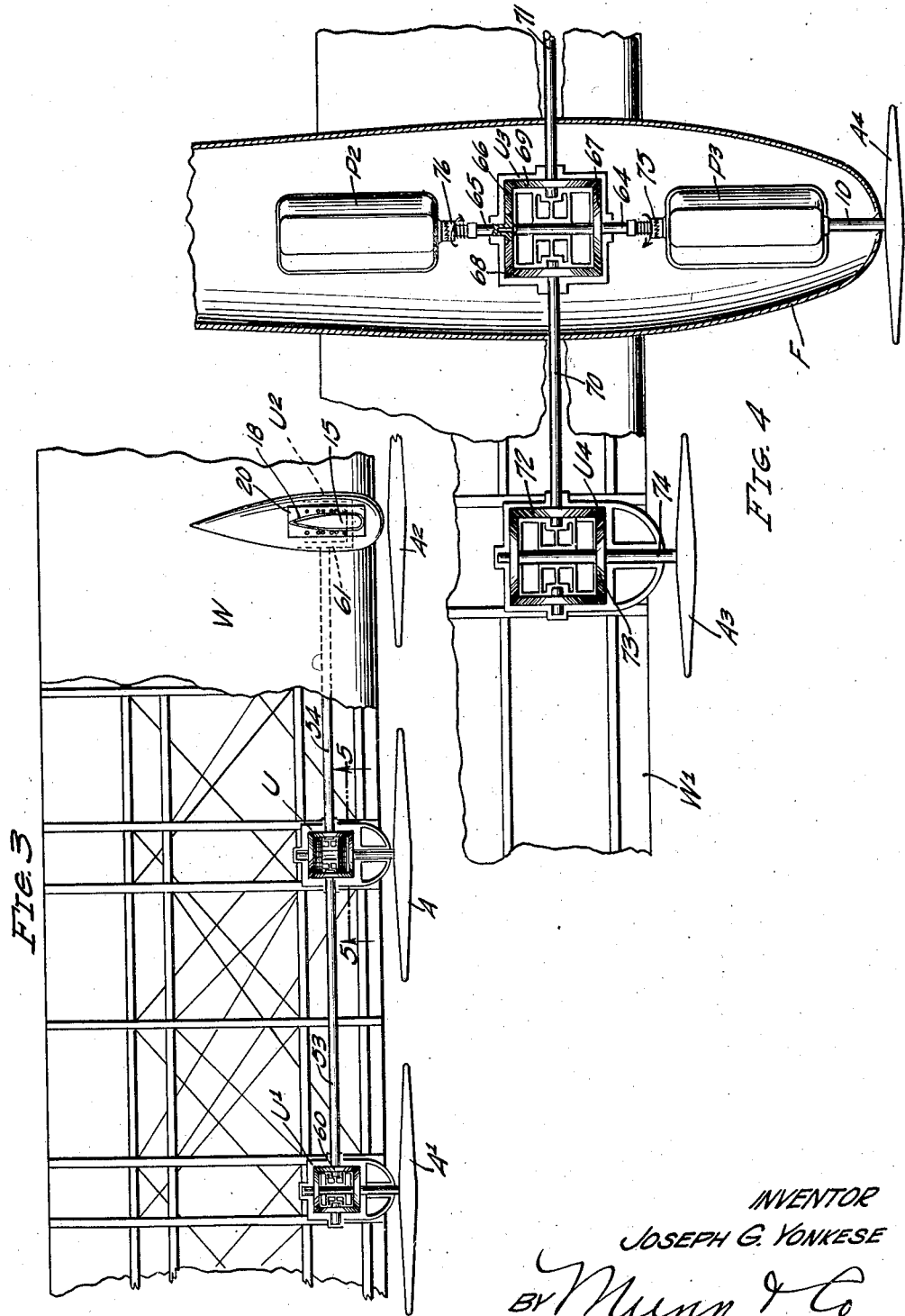
INVENTOR
JOSEPH G. YONKESE
BY Munn & Co
ATTORNEYS March 3, 1931.  J. G. YONKESE  1,794,432
TRANSMISSION CASING
Filed May 15, 1928  4 Sheets-Sheet 3
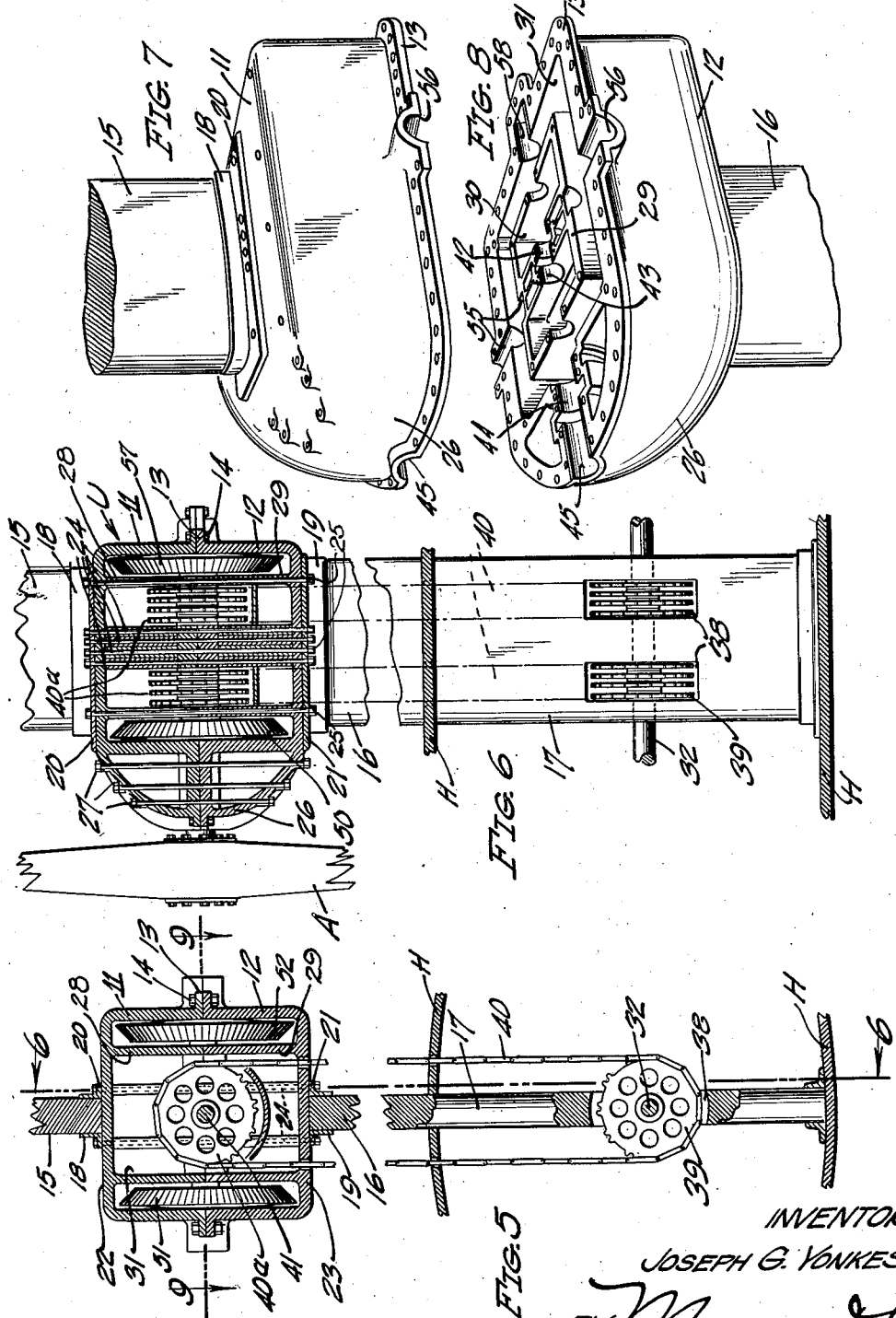
INVENTOR
JOSEPH G. YONKESE
BY Munn & C.
ATTORNEYS

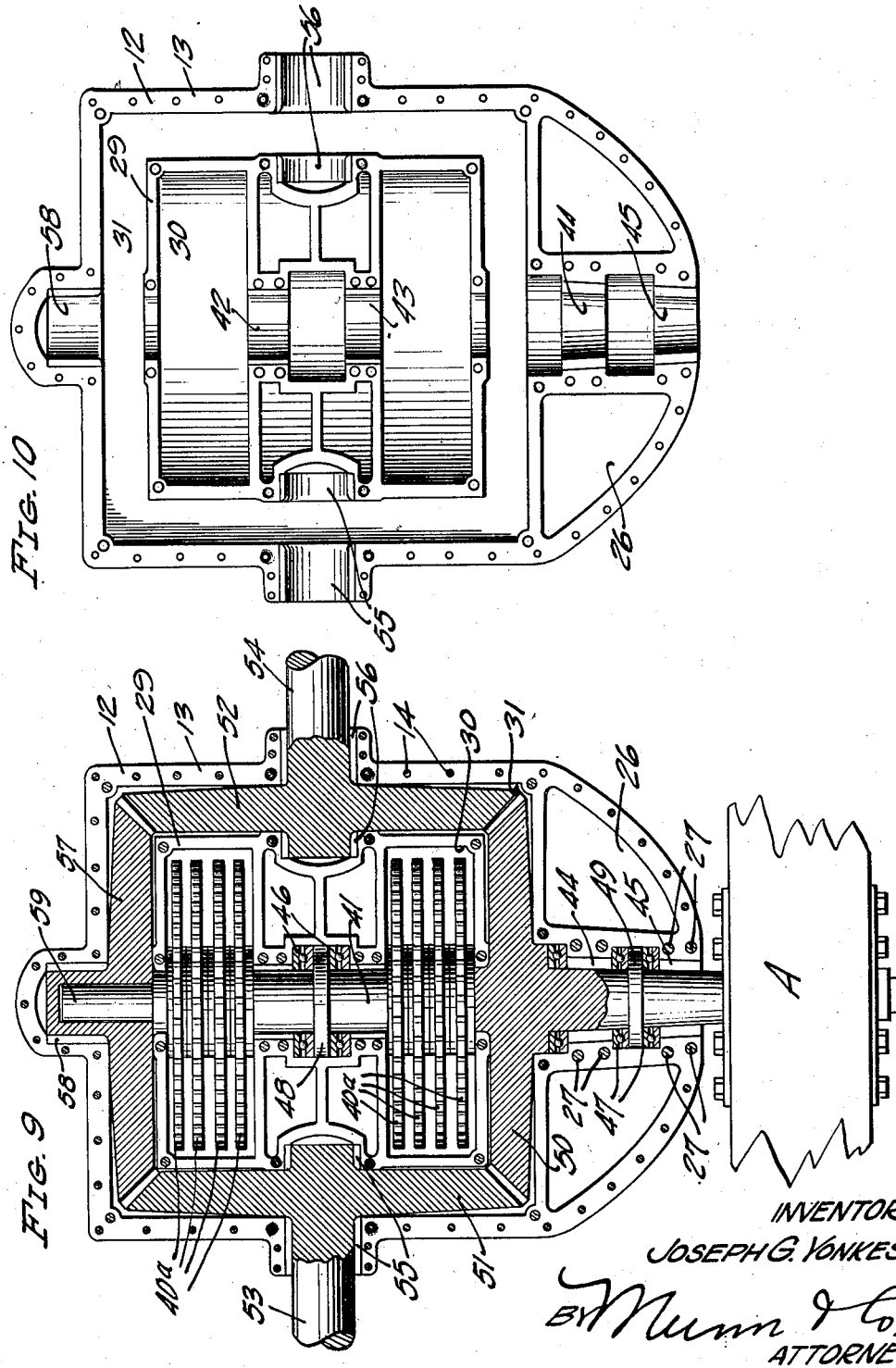

Patented Mar. 3, 1931

1,794,432

UNITED STATES PATENT OFFICE

JOSEPH G. YONKESE, OF BROOKLYN, NEW YORK

TRANSMISSION CASING

Original application filed January 22, 1927, Serial No. 162,785. Divided and this application filed May 15, 1928. Serial No. 277,988.

This application is a division of my application for U. S. Patent on Aircraft, filed January 22, 1927, Serial No. 162,785, and relates to power transmission mechanisms particularly adapted, although not necessarily, for aircraft of the larger types having large weight carrying capacity and embodying one or more power plants for driving a plurality of air screws.

It is a purpose of my present invention to provide a thoroughly dependable power transmission mechanism of comparatively simple, and extremely rugged construction, by which power from the power plant or plants can be positively transmitted with maximum smoothness and efficiency to one or more air screws located at points remote from the power plants, to the end that the latter can be grouped at the place most accessible and convenient to the mechanician for inspection and repair, such as, for example, in the fuselage or hull of the aircraft, thus permitting the center of gravity to be materially lowered and as a result increasing the stability and airworthiness of the craft.

It is another purpose of my invention to provide a power transmission mechanism by which the failure or disability of one power plant will not interfere with the continued operation of the remaining power plants so that power from the latter can be delivered to the air screws without interruption to propel the aircraft and thus avoid the necessity for, and dangers of, a forced landing.

It is a further purpose of my invention to provide a power transmission unit embodying a plurality of meshing gears for transmitting motion from one element to another, and a means operating to oppose the normal tendency of the gears to unmesh when under load, to such extent that the gears will be maintained in proper meshing relation, thus preventing breaking the gear teeth as a result of improper meshing and insuring that power will be transmitted by the gears with maximum efficiency, smoothness, and quietness.

I will describe two forms of power transmission mechanism for aircraft embodying my invention and will then point out the novel features in claims.

In the accompanying drawings,

Fig. 1 is a view showing in side elevation, partly broken away, a seaplane type of aircraft with one form of power transmission mechanism embodying my invention associated therewith;

Fig. 2 is a view similar to Fig. 1, and showing a hydroairplane type of aircraft, with another form of power transmission mechanism embodying my invention, associated therewith;

Fig. 3 is a fragmentary sectional view taken on the line 3—3 of Fig. 1 and looking in the direction of the arrows;

Fig. 4 is a fragmentary sectional view taken on the line 4—4 of Fig. 2 and looking in the direction of the arrows;

Fig. 5 is a fragmentary sectional view taken on the line 5—5 of Fig. 1 and illustrating one of a plurality of power transmission units embodying my invention;

Fig. 6 is a sectional view taken on the line 6—6 of Fig. 5 and looking in the direction of the arrows;

Figs. 7 and 8 are perspective views of sections of a two part housing embodied in the power transmission units;

Fig. 9 is an enlarged sectional view taken on the line 9—9 of Fig. 5 and looking in the direction of the arrows; and Fig. 10 is a plan view of one of the parts of the housing illustrated in Figs. 7 and 8.

Referring specifically to the drawings in which similar reference characters designate similar parts in each of the several views, one form of power transmission mechanism embodying my invention is shown associated with a type of aircraft, illustrated in Figures 1 and 3 and constituting a seaplane of large weight carrying capacity, having a body constructed to provide a hull H suitable for landing upon and sustaining the craft afloat on a body of water. In this type of craft the power plants thereof are preferably located within the hull H, so as to lower the center of gravity of the craft as much as possible and render the power plants conveniently accessible for inspection and repair as well as entirely enclose them against exposure from the elements. The power plants, of which two only are shown for the purpose of illustration are designated at P and P¹ and are arranged in end to end relation with their crankshafts alined.

Through the medium of my power transmission the power plants are rendered capable of driving a plurality of air screws A, A¹, and A² located at points remote from the power plants and illustrated as being mounted in side by side relation in advance of a wing W of the craft. This mounting of the air screws in a plane above the hull insures them against submergence or contact with the water when the craft is afloat, and thus prevents loss of power as well as damage to the air screws as a result of coming in contact with the water when in operation.

The other form of power transmission mechanism embodying my invention is shown associated with a second type of aircraft illustrated in Figures 2 and 4 and constituting a hydroairplane having a body or fuselage F beneath which is supported one or more pontoons B which are capable of supporting the craft afloat on a body of water with the fuselage elevated from the water.

In this second type of aircraft the power plants thereof are preferably mounted in the fuselage F for accessibility and protection against the elements. For the purpose of illustration two power plants P² and P³ are shown and are arranged in end to end relation with their crankshafts alined. Through the medium of the second form of transmission mechanism embodying my invention, the power plants P² and P³ are rendered capable of driving one or more air screws A³ mounted in the lower wing W¹ of the craft in the same horizontal plane as the crankshafts of the power plants, an additional air screw A⁴ being mounted directly on the crankshaft 10 of the power plant P³ directly in advance of the fuselage F.

The form of power transmission mechanism for the type of aircraft shown in Figs. 1 and 3 comprises a plurality of power transmission units, one for each of the air screws A, A¹, and A², and designated at U, U¹, and U² respectively. The units U, U¹, and U² are all identical in construction so that a description of one will suffice for all.

Each of the units U, U¹, and U² comprises a housing split to provide upper and lower mating sections 11 and 12 respectively, having flanges 13 at their confronting edges through which extend bolts 14 for securing the housing sections together to form a closed box like casing. The housing is interposed between sections 15 and 16 of a wing supporting mast 17 of the craft, and the confronting ends of the mast sections 15 and 16 seat in sockets 18 and 19 respectively, provided with flanges 20 and 21 respectively. The sockets 18 and 19 are secured to the top and bottom walls 22 and 23 of the housing sections 11 and 12 respectively, by means of a plurality of tie members in the form of relatively long and headed bolts 24 having nuts 25. The bolts 24 extend through the flanges 20 and 21, and through the housing sections, to the end that the sockets 18 and 19 and the housing sections will be securely clamped together so as to rigidly support the housing in the mast 17 and thus prevent vibration of the transmission unit when in operation, with the consequent danger of weakening the wing supporting structure of the craft.

It will be noted that the forward ends of the housing sections 11 and 12 are extended and co-operate to form a stream-lined nose 26 through which tie bolts 27 extend to further aid in securing the housing sections together.

The housing sections 11 and 12 are provided interiorly with partitions 28 and 29 respectively, to divide the sections into an inner chamber and an outer chamber entirely surrounding the sides of the inner chamber. The chambers of the housing sections co-operate when the latter are assembled to form an inner compartment 30 and an outer compartment 31 entirely separate from and surrounding the sides of the inner compartment as clearly shown in Figs. 5 to 9 inclusive.

The outer compartment 31 forms a reservoir for a quantity of lubricant, for lubricating a plurality of gears mounted in the compartment, which gears will be hereinafter more fully described.

Journaled in the mast section 17 is a shaft 32 disposed in alinement with the crankshafts of the plants P and P¹ as is clearly shown in Figs. 1 and 3. In order that the shaft 32 may be driven by both of the power plants or either of the latter without interference from the other, so that upon disabling of one of the power plants, power can continue to be delivered to the air screws A, A¹, and A² from the other power plant, overrunning clutches 33 and 34 of conventional form are provided and form operative connections between the shaft 32 and the crankshafts of the power plants. Each of the overrunning clutches comprises a disk 35 secured to the crankshaft of a power plant P or P¹ and having radial ratchet teeth on one face; and a second disk 36 having teeth on one face complementary to the teeth of the disk 35, the disk 36 being splined on an end of the shaft 32 so as to be rotatable therewith yet slidable thereon, and being normally urged to engage its teeth with those of the disk 35 by means of a spring 37 abutting a collar 37ª fixed to the shaft 32.

It will be clear that with the crankshafts of the power plants rotating in the direction of the arrows (Fig. 1) the shaft 32 will be driven, and that should either power plant cease to operate, the respective overrunning clutch will permit the shaft 32 to continue to be driven by the other power plant.

Fixed to the shaft 32 intermediate its ends, and rotatable freely in slots 38 in the mast 17 are sprocket wheels 39 about which are trained endless chains 40. The stretches of the chains 40 extend upwardly at opposite sides of the mast 17 through openings in the housing section 12 of the transmission unit U as shown in Fig. 5, and their upper ends are trained about sprocket wheels $40^a$ disposed in the inner compartment 30 of the transmission unit U and fixed to a shaft 41 rotatably mounted in journals 42, 43, 44, and 45 as shown in Fig. 9, the air screw A being fixed directly to the forward end of the shaft 41. End thrust upon the shaft 41 as a result of operation of the air screw A is resisted by pairs of thrust bearings 46 and 47 supported in the housing sections 11 and 12 and the nose 26 respectively, the thrust bearings abutting collars 48 and 49 fixed to the shaft 41, all of which is shown in Fig. 9.

Formed integral with the shaft 41 is a driving bevel gear 50, which meshes with bevel gears 51 and 52 formed integral with shafts 53 and 54 respectively, rotatably mounted in journals 55 and 56 respectively formed in the housing sections 11 and 12. An idler bevel gear 57 meshes with the gears 51 and 52, and it will be clear that all of the gears are disposed in the outer compartment 31 of the unit U so as to be constantly immersed in the lubricant contained in the compartment, thus insuring proper lubrication of the gears.

The idler gear 57 is mounted in a journal 58 formed in the housing sections 11 and 12 and axially receives a reduced extension 59 of the shaft 41 so as to aid in supporting the shaft. The idler gear 57 constitutes a means for opposing and neutralizing the tendency of the remaining gears of the train to unmesh, and resists the torque and twisting stresses upon the shafts, gears, and housing, so as to insure that the gears will be maintained in proper meshing relation, to the end that power will be smoothly and quietly transmitted by the gears.

The transmission units $U^1$ and $U^2$ for the air screws $A^1$ and $A^2$ respectively are each provided with an arrangement of gearing identical to that above described, one of the gears 60 of the transmission unit $U^1$ being fixed to the shaft 53, while one of the gears 61 of the transmission unit $U^2$ is fixed to the shaft 54, and all of which is shown in Fig. 3, to the end that with one or both of the power plants P and $P^1$ in operation all of the air screws A, $A^1$, and $A^2$ will be driven to propel the aircraft.

It will be understood that all of the journals for mounting the shafts 41, 53, 54 and the gears 50, 51, 52, and 57 are formed in sections, one-half of each journal being formed in the upper housing section 11 and the other half being formed in the lower housing section 12, the halves of the journals forming complete journals when the housing sections are assembled.

Furthermore, certain of the tie bolts 24 and 27 extend through the housing sections 11 and 12 in sufficiently close proximity to the journals to reinforce the latter and produce a clamping action thereupon to firmly secure the sections of the journals together.

Referring now to Figs. 2 and 4 illustrating a second form of power transmission mechanism embodying my invention, a transmission unit $U^3$ embodying a housing identical in construction to the housings of the units U, $U^1$, and $U^2$ with the exception that the nose 26 is omitted, is interposed between and associated with mast sections 62 and 63 (Fig. 2) in the same manner and by a means similar to that described for the unit U.

The unit $U^3$ is supported by the mast sections to dispose alined shafts 64 and 65, in alinement with the confronting ends of the crankshafts of the power plants $P^2$ and $P^3$. As shown in Fig. 4, the shafts 64 and 65 are rotatably mounted in the housing of the unit $U^3$ and have fixed thereto bevel gears 66 and 67 respectively, with which mesh bevel gears 68 and 69 fixed to shafts 70 and 71 respectively, also rotatably mounted in the housing of the unit.

The shafts 70 and 71 extend in opposite directions in the wing $W^1$ for operative connection to other and identical transmission units, the one for the air screw $A^3$ only being shown in Fig. 4 and designated generally at $U^4$. The unit $U^4$ embodies a housing and gearing arrangement identical to that described for the units U, $U^1$, and $U^2$, and the shaft 70 is fixed to one of the gears 72 in the housing, meshing with another of the gears 73 therein and fixed to a shaft 74 carrying the air screw $A^3$.

Overrunning clutches 75 and 76, identical in construction to the clutches 33 and 34 previously described, are interposed between the shafts 64 and 65 and the crankshafts of the power plants $P^2$ and $P^3$ and permit power to be delivered to the shafts 70 and 71 by both of the power plants or by either of the power plants independently of the other, so that should one of the power plants cease to operate, power will continue to be delivered to the air screws from the other power plant and thus propel the aircraft.

Although I have herein shown and described only two forms of power transmission mechanism for aircraft embodying my invention, it is to be understood that various changes and modifications may be made therein without departing from the spirit of the invention and the spirit and scope of the appended claims.

I claim:

1. In a power transmission unit, a sectional housing adapted to be interposed between sections of a mast and having sockets into which the confronting ends of the mast sections are adapted to be received, and means common to the housing sections and sockets for securing the sections of the housing together and the sockets to the housing.

2. In a power transmission unit, a sectional housing adapted to be interposed between sections of a mast, sockets into which the confronting ends of the mast sections are adapted to be received, and tie members extending through the housing sections and sockets for securing the sections of the housing together and the sockets to the housing.

3. In a power transmission unit, a two part housing adapted to be interposed between sections of a mast, sockets into which the confronting ends of the mast sections are adapted to be received, and tie members extending through the housing sections for securing the latter together, certain of the tie members extending also through the sockets to secure the latter to the housing.

4. In a power transmission unit, a housing having bearings therein in which shafts are adapted to be mounted, the housing being split to divide the housing and bearings into sections, and tie members extending through the housing sections in close proximity to the bearings for securing the housing sections together and reinforcing the bearing sections to maintain them in bearing forming formation.

5. In a power transmission unit, a housing adapted to be interposed between sections of a mast and having bearings therein in which gear carrying shafts are adapted to be mounted, the housing being split to divide the housing and bearings into sections, sockets on the housing sections in which the confronting ends of the mast sections are adapted to be received, tie members extending through the housing sections for clamping the latter together, certain of the tie members extending through portions of the sockets to secure the latter to the housing sections, and others of the tie members extending through the sections in close proximity to the bearing sections to clamp the latter together in bearing forming formation.

6. In a power transmission unit, a housing adapted to be interposed between sections of a mast and having bearings therein in which gear carrying shafts are adapted to be mounted, the housing being split to divide the housing and bearings into sections, sockets on the housing sections in which the confronting ends of the mast sections are adapted to be received, tie members extending through the housing sections for clamping the latter together, certain of the tie members extending through portions of the sockets to clamp the latter to the housing sections, and through the housing sections at points in close proximity to the bearing sections to reinforce and clamp the latter together in bearing forming formation.

7. A power transmission unit comprising a two part housing divided interiorly to provide an inner compartment and an outer compartment, shafts journaled in the housing, gears mounted on the shafts within the outer compartment of the housing and disposed in meshing relation, and means for securing the parts of the housing together.

8. A power transmission unit comprising a two part housing divided interiorly to provide an inner compartment and an outer compartment, shafts journaled in the housing, gears mounted on the shafts within the outer compartment of the housing and disposed in meshing relation, and means for securing the parts of the housing together, one of the shafts extending through the inner compartment, a sprocket wheel fixed to said one of the shafts, and a chain trained about the sprocket wheel and extending exteriorly of the housing for a driving connection with a second sprocket.

9. A power transmission unit comprising a housing constructed of a pair of separable mating sections, each of the housing sections having bearing sections therein and provided with a continuous partition to divide the housing sections into an inner chamber and an outer chamber, the chambers of the housing sections co-operating when the latter are assembled, to form an inner compartment and a closed outer compartment surrounding and separate from the inner compartment to form a lubricant reservoir, the bearing sections co-operating when the housing sections are assembled, to form bearings, shafts mounted in the bearings, gears on the shafts within the outer compartment and disposed in meshing relation, and means for securing the housing sections together.

10. A power transmission unit comprising a two part housing, the parts of which have inner and outer side walls co-operating to divide the housing into an inner compartment and an outer closed compartment surrounding the sides of and separate from the inner compartment to form a lubricant reservoir, shafts journaled in the housing in intersecting relation, gears on the shafts within the outer compartment and disposed in meshing relation, and tie members for securing the housing sections together.

11. A power transmission unit comprising a two part housing, the parts of which have inner and outer side walls co-operating to divide the housing into an inner compartment and an outer closed compartment surrounding the sides of and separate from the inner compartment to form a lubricant reservoir, a pair of alined shafts journaled between the housing sections, a second pair of alined shafts journaled in the housing sections at right angles to the first mentioned pair and telescopically associated with each other, bevel gears on the shafts within the outer compartment and disposed in meshing relation, and tie members extending through the housing sections for securing the latter together.

Signed at Los Angeles, in the county of Los Angeles and State of California, this 4th day of May, A. D. 1928.

JOSEPH G. YONKESE.